US008248528B2

(12) United States Patent
Hosking et al.

(10) Patent No.: US 8,248,528 B2
(45) Date of Patent: Aug. 21, 2012

(54) CAPTIONING SYSTEM

(75) Inventors: Ian Michael Hosking, Cambridge (GB);
Aled Wynne Jones, Lode (GB);
Michael Raymond Reynolds, Royston
(GB); Peter John Kelly, Cambridge
(GB); Michael David Emmens, Shap
(GB)

(73) Assignee: Intrasonics S.A.R.L., Luxembourg (LU)

( * ) Notice: Subject to any disclaimer, the term of this patent is extended or adjusted under 35 U.S.C. 154(b) by 1148 days.

(21) Appl. No.: 10/500,016

(22) PCT Filed: Dec. 23, 2002

(86) PCT No.: PCT/GB02/05908
§ 371 (c)(1),
(2), (4) Date: Apr. 18, 2005

(87) PCT Pub. No.: WO03/061285
PCT Pub. Date: Jul. 24, 2003

(65) Prior Publication Data
US 2005/0227614 A1  Oct. 13, 2005

(30) Foreign Application Priority Data

Dec. 24, 2001 (GB) .................................. 0130936.8
Feb. 25, 2002 (GB) .................................. 0204323.0

(51) Int. Cl.
*H04N 11/00* (2006.01)
(52) U.S. Cl. ............ 348/468; 725/61; 725/62; 348/461; 455/422.1
(58) Field of Classification Search .................. None
See application file for complete search history.

(56) References Cited

U.S. PATENT DOCUMENTS

| 657,379 | A | 9/1900 | Bakken |
| 2,660,662 | A | 11/1953 | Scherbatskoy |
| 3,651,471 | A | 3/1972 | Haselwood |
| 3,732,536 | A | 5/1973 | Larka et al. |
| 3,742,463 | A | 6/1973 | Haselwood |
| 3,845,391 | A | 10/1974 | Crosby |
| 4,025,851 | A | 5/1977 | Haselwood |
| 4,237,449 | A | 12/1980 | Zibell |

(Continued)

FOREIGN PATENT DOCUMENTS

CA   2 073 387 A1   1/1993

(Continued)

OTHER PUBLICATIONS

*Simultaneous Subliminal Signalling in Conventional Sound Circuits: A Feasibility Study*, BBC and the ITA, Research Department Report No. 1971/1, Jan. 1971, pp. 1-12.

(Continued)

*Primary Examiner* — Brian Pendleton
*Assistant Examiner* — Dika C. Okeke
(74) *Attorney, Agent, or Firm* — Alston & Bird LLP

(57) ABSTRACT

A captioning system is provided for providing captions for audio and/or video presentations. The captioning system can be used to provide text captions or audio descriptions of a video presentation. A user device is provided for the captioning system having a receiver operable to receive the captions together with synchronization information and a caption output circuit which is operable to output the captions at the appropriate timings defined by the synchronization information. The user device is preferably a portable hand-held device such as a mobile telephone, PDA or the like.

46 Claims, 7 Drawing Sheets

U.S. PATENT DOCUMENTS

| | | | |
|---|---|---|---|
| 4,425,642 A | 1/1984 | Moses et al. | |
| 4,514,725 A | 4/1985 | Bristley | |
| 4,642,685 A | 2/1987 | Roberts et al. | |
| 4,718,106 A | 1/1988 | Weinblatt | |
| 4,750,034 A | 6/1988 | Lem | |
| 4,807,031 A | 2/1989 | Broughton | |
| 4,840,602 A | 6/1989 | Rose | |
| 4,846,693 A | 7/1989 | Baer | |
| 4,923,428 A | 5/1990 | Curran | |
| 4,945,412 A | 7/1990 | Kramer | |
| 5,085,610 A | 2/1992 | Engel | |
| 5,090,936 A | 2/1992 | Satoh et al. | |
| 5,108,341 A | 4/1992 | DeSmet | |
| 5,113,437 A | 5/1992 | Best | |
| 5,136,613 A | 8/1992 | Dumestre, III | |
| 5,191,615 A | 3/1993 | Aldava | |
| 5,301,167 A | 4/1994 | Proakis et al. | |
| 5,305,348 A | 4/1994 | Izumi | |
| 5,314,336 A | 5/1994 | Diamond | |
| 5,319,735 A | 6/1994 | Preuss et al. | |
| 5,353,352 A | 10/1994 | Dent et al. | |
| 5,412,620 A | 5/1995 | Cafarella | |
| 5,436,941 A | 7/1995 | Dixon et al. | |
| 5,442,343 A | 8/1995 | Cato et al. | |
| 5,446,756 A | 8/1995 | Mallinckrodt | |
| 5,450,490 A | 9/1995 | Jensen | |
| 5,461,371 A * | 10/1995 | Matsumoto et al. | 340/8.1 |
| 5,475,798 A * | 12/1995 | Handlos | 704/277 |
| 5,479,442 A | 12/1995 | Yamamoto | |
| 5,493,281 A * | 2/1996 | Owens | 340/12.5 |
| 5,499,265 A | 3/1996 | Dixon | |
| 5,519,779 A | 5/1996 | Proctor et al. | |
| 5,539,705 A | 7/1996 | Akerman | |
| 5,555,258 A | 9/1996 | Snelling et al. | |
| 5,574,773 A | 11/1996 | Grob et al. | |
| 5,579,124 A | 11/1996 | Aijala | |
| 5,604,767 A | 2/1997 | Dixon et al. | |
| 5,648,789 A * | 7/1997 | Beadles et al. | 345/8 |
| 5,657,379 A | 8/1997 | Honda et al. | |
| 5,663,766 A | 9/1997 | Sizer, II | |
| 5,687,191 A | 11/1997 | Lee | |
| 5,719,937 A | 2/1998 | Warren | |
| 5,734,639 A | 3/1998 | Bustamante et al. | |
| 5,752,880 A | 5/1998 | Gabai | |
| 5,774,452 A | 6/1998 | Wolosewicz | |
| 5,822,360 A | 10/1998 | Lee | |
| 5,828,325 A | 10/1998 | Wolosewicz | |
| 5,848,155 A | 12/1998 | Cox | |
| 5,893,067 A | 4/1999 | Bender et al. | |
| 5,918,223 A | 6/1999 | Blum et al. | |
| 5,930,369 A | 7/1999 | Cox | |
| 5,937,000 A | 8/1999 | Lee et al. | |
| 5,940,135 A | 8/1999 | Petrovic et al. | |
| 5,945,932 A | 8/1999 | Smith et al. | |
| 5,960,398 A | 9/1999 | Fuchigami | |
| 5,963,909 A | 10/1999 | Warren | |
| 5,974,116 A * | 10/1999 | Engelke et al. | 379/52 |
| 5,978,413 A | 11/1999 | Bender | |
| 5,999,899 A | 12/1999 | Robinson | |
| 6,021,432 A | 2/2000 | Sizer, II | |
| 6,022,273 A | 2/2000 | Gabai | |
| 6,035,177 A | 3/2000 | Moses et al. | |
| 6,061,793 A | 5/2000 | Tewfik et al. | |
| 6,125,172 A | 9/2000 | August et al. | |
| 6,263,505 B1 | 7/2001 | Walker et al. | |
| 6,290,566 B1 | 9/2001 | Gabai | |
| 6,298,322 B1 | 10/2001 | Lindemann | |
| 6,309,275 B1 | 10/2001 | Fong | |
| 6,370,666 B1 | 4/2002 | Lou et al. | |
| 6,389,055 B1 | 5/2002 | August | |
| 6,434,253 B1 | 8/2002 | Hayashi et al. | |
| 6,438,117 B1 | 8/2002 | Grilli et al. | |
| 6,442,283 B1 | 8/2002 | Tewfik et al. | |
| 6,442,518 B1 * | 8/2002 | Van Thong et al. | 704/235 |
| 6,463,413 B1 * | 10/2002 | Applebaum et al. | 704/256.2 |
| 6,512,919 B2 * | 1/2003 | Ogasawara | 455/422.1 |
| 6,584,138 B1 | 6/2003 | Neubauer et al. | |
| 6,636,551 B1 | 10/2003 | Ikeda et al. | |
| 6,650,877 B1 | 11/2003 | Tarbouriech et al. | |
| 6,701,162 B1 * | 3/2004 | Everett | 455/556.1 |
| 6,708,214 B1 | 3/2004 | La Fleur | |
| 6,737,957 B1 | 5/2004 | Petrovic et al. | |
| 6,765,950 B1 | 7/2004 | Nuytkens et al. | |
| 6,773,344 B1 | 8/2004 | Gabai et al. | |
| 6,782,253 B1 | 8/2004 | Shteyn et al. | |
| 6,785,539 B2 * | 8/2004 | Hale et al. | 455/422.1 |
| 6,832,093 B1 | 12/2004 | Ranta | |
| 6,850,555 B1 | 2/2005 | Barclay | |
| 6,876,623 B1 | 4/2005 | Lou et al. | |
| 6,892,175 B1 | 5/2005 | Cheng et al. | |
| 7,031,271 B1 | 4/2006 | LaRosa et al. | |
| 7,110,951 B1 * | 9/2006 | Lemelson et al. | 704/270 |
| 7,158,676 B1 | 1/2007 | Rainsford | |
| 7,308,486 B2 * | 12/2007 | Althin et al. | 709/219 |
| 8,131,208 B2 * | 3/2012 | Slotznick | 455/3.05 |
| 2001/0025241 A1 * | 9/2001 | Lange et al. | 704/235 |
| 2001/0030710 A1 | 10/2001 | Werner | |
| 2002/0069263 A1 | 6/2002 | Sears et al. | |
| 2003/0051252 A1 * | 3/2003 | Miyaoku et al. | 725/109 |
| 2003/0153355 A1 * | 8/2003 | Warren | 455/557 |
| 2004/0137929 A1 | 7/2004 | Jones et al. | |
| 2004/0169581 A1 | 9/2004 | Petrovic et al. | |
| 2008/0027734 A1 | 1/2008 | Zhao et al. | |
| 2008/0049971 A1 | 2/2008 | Ramos et al. | |

FOREIGN PATENT DOCUMENTS

| | | | |
|---|---|---|---|
| CA | 2129925 | * | 2/1996 |
| CA | 2 162 614 A1 | | 5/1996 |
| CA | 2 230 071 A1 | | 6/1996 |
| CA | 2 457 089 A1 | | 2/2003 |
| DE | 3229405 | | 2/1984 |
| EP | 0135192 | | 3/1985 |
| EP | 0172095 | | 2/1986 |
| EP | 0347401 | | 12/1989 |
| EP | 0 688 487 A0 | | 5/1994 |
| EP | 0606703 | | 7/1994 |
| EP | 0631226 | | 12/1994 |
| EP | 0 669 070 | | 5/1995 |
| EP | 0674405 | | 9/1995 |
| EP | 0713335 A2 | | 5/1996 |
| EP | 0766468 | | 4/1997 |
| EP | 0779759 A2 | | 6/1997 |
| EP | 0 883 939 | | 8/1997 |
| EP | 0822550 | | 2/1998 |
| EP | 0828372 | | 3/1998 |
| EP | 0863631 | | 9/1998 |
| EP | 0872995 | | 10/1998 |
| EP | 1 064 742 | | 7/1999 |
| EP | 1158800 | | 11/2001 |
| EP | 1 423 936 A0 | | 3/2003 |
| EP | 1 576 582 A0 | | 6/2004 |
| EP | 1542227 A1 | | 6/2005 |
| FR | 2626731 | | 8/1989 |
| GB | 2135536 | | 8/1984 |
| GB | 2192743 | | 1/1988 |
| GB | 2196167 | | 4/1988 |
| GB | 2 256 113 A | | 11/1992 |
| GB | 2301989 A | | 12/1996 |
| GB | 2334133 | | 8/1999 |
| GB | 2343774 | | 5/2000 |
| GB | 2 345 779 A | | 7/2000 |
| GB | 2345779 | | 7/2000 |
| GB | 2386526 A | | 9/2003 |
| JP | 58-69536 A | | 4/1958 |
| JP | 63-147738 U | | 9/1963 |
| JP | 59-166545 U | | 11/1984 |
| JP | 63-088673 | | 4/1988 |
| JP | 63-272134 A | | 11/1988 |
| JP | 04-092518 | | 3/1992 |
| JP | 5252578 A | | 9/1993 |
| JP | 05-316598 | | 11/1993 |
| JP | 06-311079 | | 11/1994 |
| JP | 07-245782 | | 9/1995 |
| JP | 10-021259 | | 1/1998 |
| JP | 2000152217 | | 5/2000 |
| JP | 2000-207170 | | 7/2000 |
| JP | 2000-236576 | | 8/2000 |

| | | |
|---|---|---|
| JP | 2000-267952 | 9/2000 |
| JP | 2000-308130 | 11/2000 |
| WO | 9110490 | 7/1991 |
| WO | 9110491 | 7/1991 |
| WO | 9307689 | 4/1993 |
| WO | 9408677 | 4/1994 |
| WO | 9619274 | 6/1996 |
| WO | 9721279 | 6/1997 |
| WO | 9731440 | 8/1997 |
| WO | 9733391 | 9/1997 |
| WO | 9741936 | 11/1997 |
| WO | WO 98/06195 A1 | 2/1998 |
| WO | WO 98/26529 A2 | 6/1998 |
| WO | 9832248 | 7/1998 |
| WO | 9900979 | 1/1999 |
| WO | 0015316 | 3/2000 |
| WO | WO 00/21203 A1 | 4/2000 |
| WO | WO 00/39955 A1 | 7/2000 |
| WO | WO 00/44168 A1 | 7/2000 |
| WO | 0057586 | 9/2000 |
| WO | 0110065 | 2/2001 |
| WO | WO 01/31816 A1 | 5/2001 |
| WO | 0157619 | 8/2001 |
| WO | WO 01/61987 A2 | 8/2001 |
| WO | 0211123 | 2/2002 |
| WO | 0245273 | 6/2002 |
| WO | 0245286 | 6/2002 |
| WO | WO 03/102947 A1 | 12/2003 |
| WO | WO 2004/036352 A2 | 4/2004 |
| WO | WO 2005/122640 A1 | 12/2005 |

OTHER PUBLICATIONS

Bender, W. et al. Techniques for Data Hiding, SPIE vol. 2420, pp. 164-173.

Bender, "Techniques for Data Hiding", "IBM Systems Journal, MIT Media Lab", 1995, pp. 313; 323-336, vol. 35, No. 3, 4.

Sundaram, "An Embedded Cryptosystem for Digital Broadcating", "IEEE 6th International Conference on Universal Personal Communications Record", Oct. 12-16, 1997, pp. 401-405, vol. 2 of 2, Published in: San Diego, CA.

Neubauer, "Continuous Steganorgraphic Data Transmission Using Uncompressed Audio", "Lecture Notes in Computer Science 1525, Information Hiding, 2nd International Workshop, IH '98", Apr. 1998, pp. 208-217, Published in: Portland, Oregon.

Chung, "Digital Watermarking for Copyright Protection of MPEF2 Compressed Video", "IEEE Transactions on Consumer Electronics", Aug. 1998, pp. 895-901, vol. 44, No. 3.

Cox, "Secure Spread Specturm Watermarking for Mulitmedia", "IEEE Transactions on Image Processing", Oct. 1997, pp. 1673-1687, vol. 6, No. 12.

Cox, "A Secure, Robust Watermark for Multimedia", "1st International Workshop", May/Jun. 1996, pp. 185-206, Published in: Cambridge, UK.

Pohlmann, "Fundamentals of Digital Audio; Digital Audio Tape (DAT); The Compact Disc", "Principles of Digital Audio, Second Edition", , pp. 47-48; 255-256; 323.

Cox, "Secure Spread Spectrum Watermarking for Images, Audio and Video", "International Conference on Image Processing", Sep. 16-19, 1996, pp. 243-246, vol. 3 of 3, Published in: Lausanne, Switzerland.

Iwakiri, "Digital Watermark Scheme for Hight Quality Audio Data by Spectrum Spreading and Modified Discrete Cosine Transform", "Information Processing Society of Japan", Sep. 1998, pp. 2631-2637, vol. 39, No. 9, Published in: Japan.

Seok, "Prediction-Based Audio Watermark Detection Algorithm", "Presented At the 109TH Convention Sep. 22-25, 2000 AES", Sep. 22-25, 2000, pp. 1-11, Publisher: Audio Engineering Society , Published in: Los Angeles, CA.

Swanson, "Robust Audio Watermarking Using Perceptual Masking", "Signal Processing", 1998, pp. 337-355, vol. 66, Publisher: Elsevier Science.

Cox, "A Secure, Imperceptible Yet Perceptually Salient, Spread Spectrum Watermark for Multimedia", "SouthCon 96, Conference Record", Jun. 25-27, 1996, pp. 192-197, Published in: Orlando, FL.

International Search Report for International Application No. PCT/GB2009/001354 completed Aug. 11, 2009; 3 pages.

International Search Report for International Application No. PCT/GB2002/005908 completed Jan. 15, 2004; 3 pages.

Chen, T.C., et al.; "Highly Robust, Secure and Perceptual-Quality Echo Hiding Scheme"; IEEE Transactions on Audio, Speech, and Language Processing; IEEE Service Center, New York, NY; US; vol. 16; No. 3; Mar. 2008; pp. 629-638.

Dymarski, P.; "Watermarking of Audio Signals Using Adaptive Subband Filtering and Manchester Signaling"; 14th International Workshop on Systems, Signals and Image Processing and Eurasip Conference Focused on Speech and Image Processing, Multimedia Communications and Services; IEEE; 2007; pp. 221-224.

Gerasimov, V., et al.; "Things that talk: Using sound for device-to-device and device-to-human communication"; IBM Systems Journal; vol. 39; Nos. 3 & 4; 2000; pp. 530-546.

Gruhl, Daniel., et al.; "Echo Hiding"; Proceedings of the First International Workshop on Information Hiding ; vol. 295; 1996; pp. 295-315, XP002040126.

Huang, Dong-Yan, et al.; "Robust and Inaudible Multi-echo Audio Watermarking"; PCM '02 Proceedings of the Third IEEE Pacific Rim Conference on Multimedia: Advances in Multimedia Information Processing; 2002; pp. 615-622.

Petrovic, R., et al.; "Data Hiding within Audio Signals"; 4th International Conference on Telecommunications in Modern Satellite, Cable and Broadcasting Services; 1999; pp. 88-95; XP010359110.

Wu, Wen-Chih, et al.; "An Analysis-by-Synthesis Echo Watermarking Method"; 2004 IEEE International Conference on Multimedia and Expo (ICME); 2004; pp. 1935-1938.

* cited by examiner

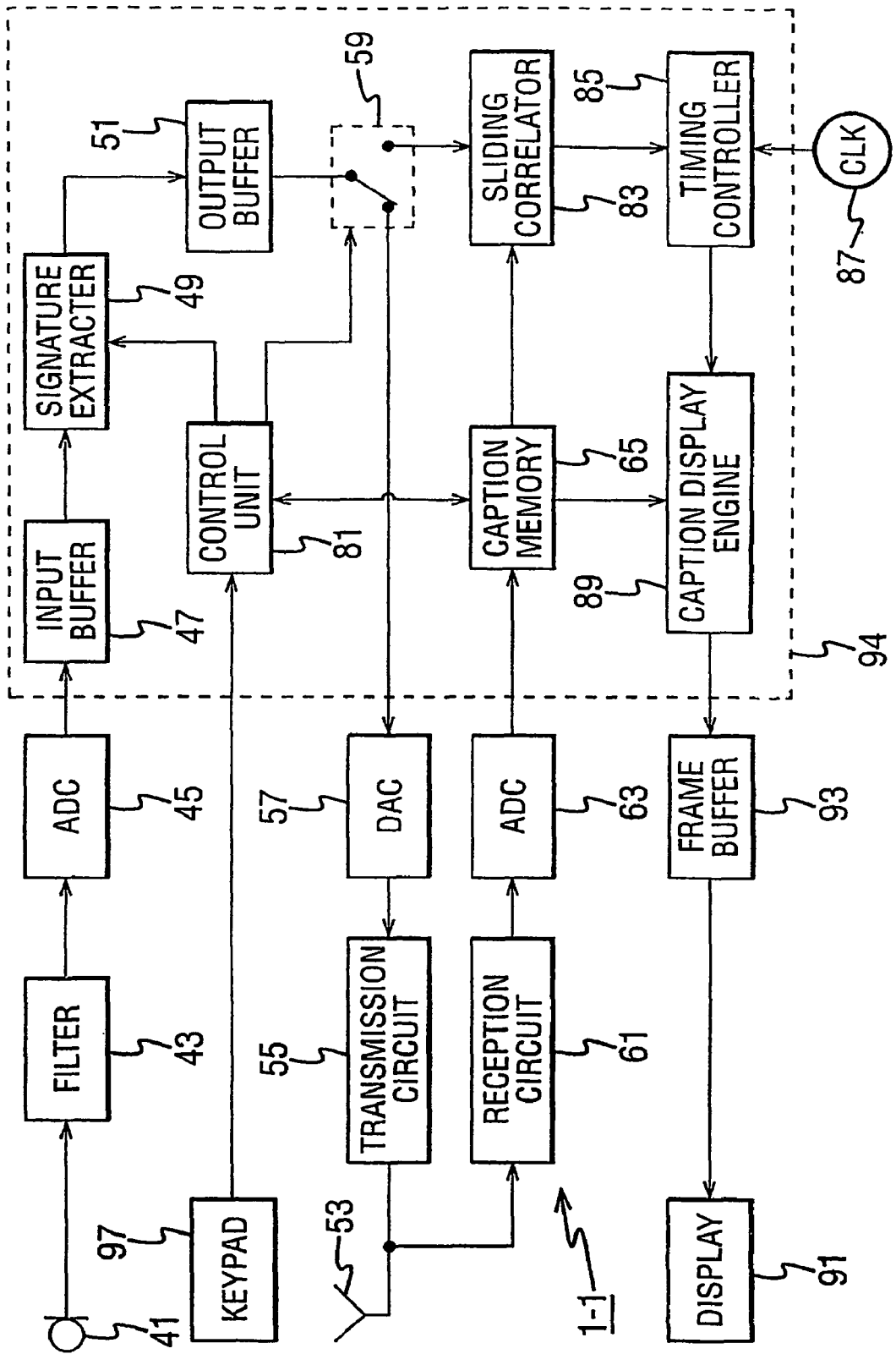

CAPTIONING SYSTEM

The present invention relates to a system and method and parts thereof for providing captions for audio or video or multi-media presentations. The invention has particular though not exclusive relevance to the provision of such a captioning system to facilitate the enjoyment of the audio, video or multimedia presentation by people with sensory disabilities.

A significant proportion of the population with hearing difficulties benefit from captions (in the form of text) on video images such as TV broadcasts, video tapes, DVD and films. There are currently two types of captioning systems available for video images—on-screen caption systems and off-screen caption systems. In on-screen caption systems, the caption text is displayed on-screen and it obscures part of the image. This presents a particular problem with cinema where there is a reluctance for this to happen with general audiences. In the off-screen caption system, the text is displayed on a separate screen. Whilst this overcomes some of the problems associated with the on-screen caption system, this solution adds additional cost and complexity and currently has had poor takeup in cinemas for this reason.

In addition to text captioning systems for people with hearing difficulties, there are also captioning systems which provide audio captions for people with impaired eyesight. In this type of audio captioning system, an audio description of what is being displayed is provided to the user in a similar way to the way in which subtitles are provided for the hard of hearing.

One aim of the present invention is to provide an alternative captioning system for the hard of hearing or an alternative captioning system for those with impaired eyesight. The captioning system can also be used by those without impaired hearing or eyesight, for example, to provide different language captions or the lyrics for songs.

According to one aspect, the present invention provides a captioning system comprising: a caption store for storing one or more sets of captions each being associated with one or more presentations and each set comprising at least one caption for playout at different timings during the associated presentation; and a user device having: (i) a memory for receiving and storing at least one set of captions for a presentation from the caption store; (ii) a receiver operable to receive synchronisation information defining the timing during the presentation at which each caption in the received set of captions is to be output to the user; and (iii) a caption output circuit operable to output to the associated user, the captions in the received set of captions at the timings defined by the synchronisation information.

In one embodiment, the captions are text captions which are output to the user on a display associated with the user device. In another embodiment, the captions are audio signals which are output to the user as acoustic signals via a loudspeaker or earphone. The captioning system can be used, for example in cinemas, to provide captions to people with sensory disabilities to facilitate their understanding and enjoyment of, for example, films or other multimedia presentations.

The user device is preferably a portable hand-held device such as a mobile telephone or personal digital assistant, as there are small and lightweight and most users have access to them. The use of such a portable computing device is also preferred since it is easy to adapt the device to operate in the above manner by providing the device with appropriate software.

The caption store may be located in a remote server in which case the user device is preferably a mobile telephone (or a PDA having wireless connectivity) as this allows for the direct connection between the user device and the remote server. Alternatively, the caption store may be a kiosk at the venue at which the presentation is to be made, in which case the user can download the captions and synchronisation information when they arrive. Alternatively, the caption store may simply be a memory card or smart-card which the user can insert into their user device in order to obtain the set of captions for the presentation together with the synchronisation information.

According to another aspect, the present invention provides a method of manufacturing a computer readable medium storing caption data and synchronisation data for use in a captioning system, the method comprising: providing a computer readable medium; providing a set of captions that is associated with a presentation which comprises a plurality of captions for playout at different timings during the associated presentation; providing synchronisation information defining the timing during the presentation at which each caption in the set of captions is to be output to a user; receiving a computer readable medium; recording computer readable data defining said set of captions and said synchronisation information on said computer readable medium; and outputting the computer readable medium having the recorded caption and synchronisation data thereon.

Exemplary embodiments of the present invention will now be described with reference to the accompanying drawings, in which.

Figure 1:
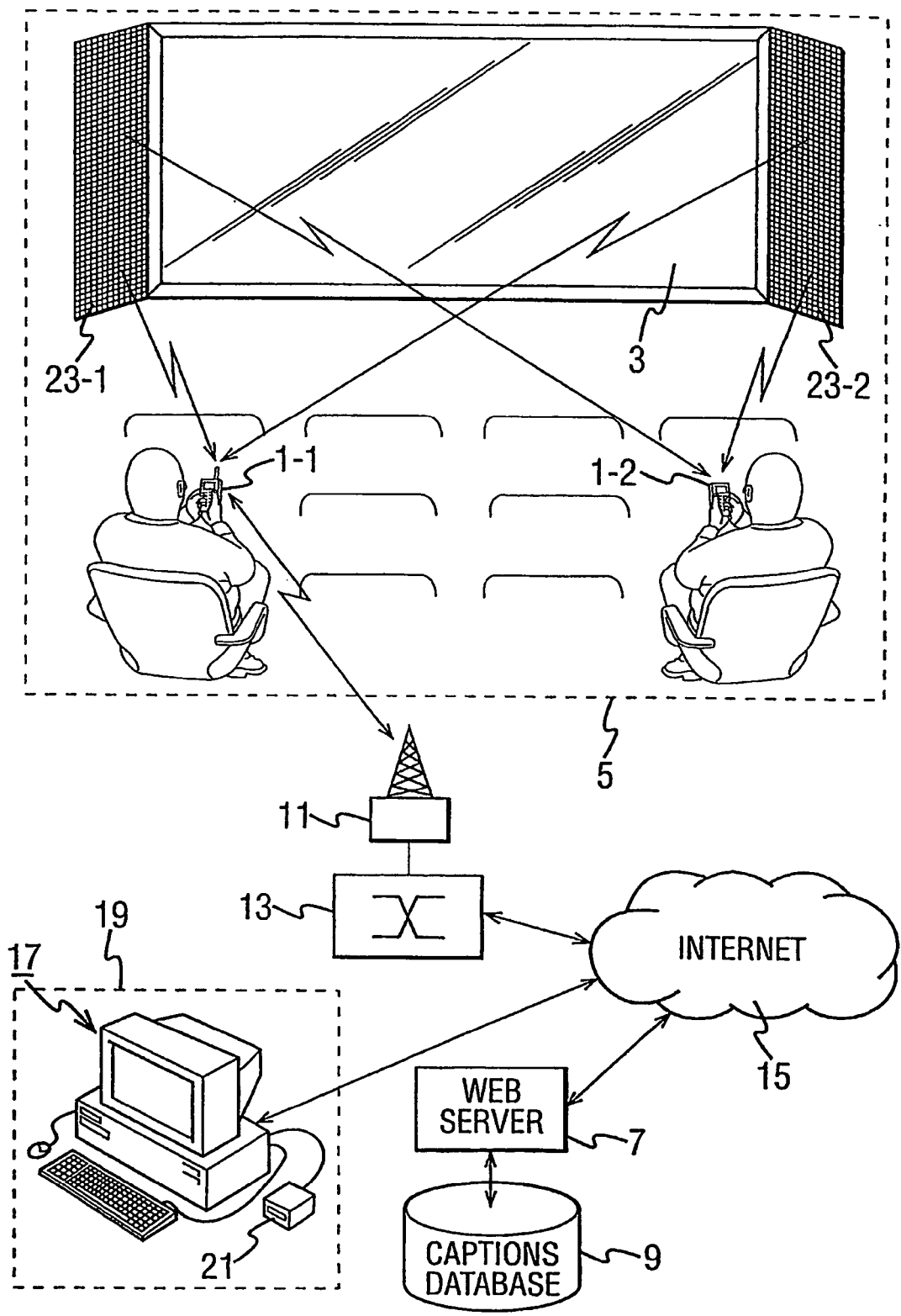
FIG. 1 is a schematic overview of a captioning system embodying the present invention.
Figure 2C:
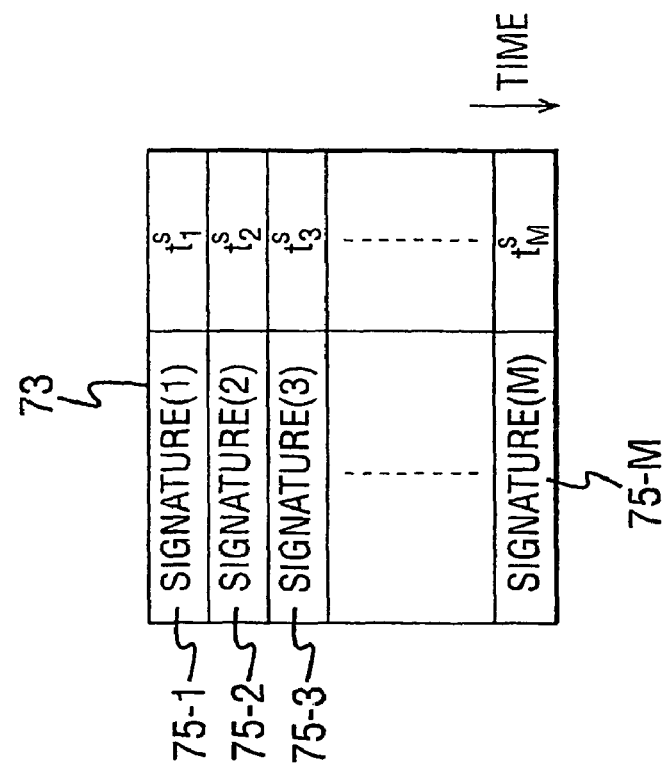
FIG. 2c is a representation of a synchronisation file downloaded to the mobile telephone shown in FIG. 2a from the remote web server shown in FIG. 1.
Figure 2B:
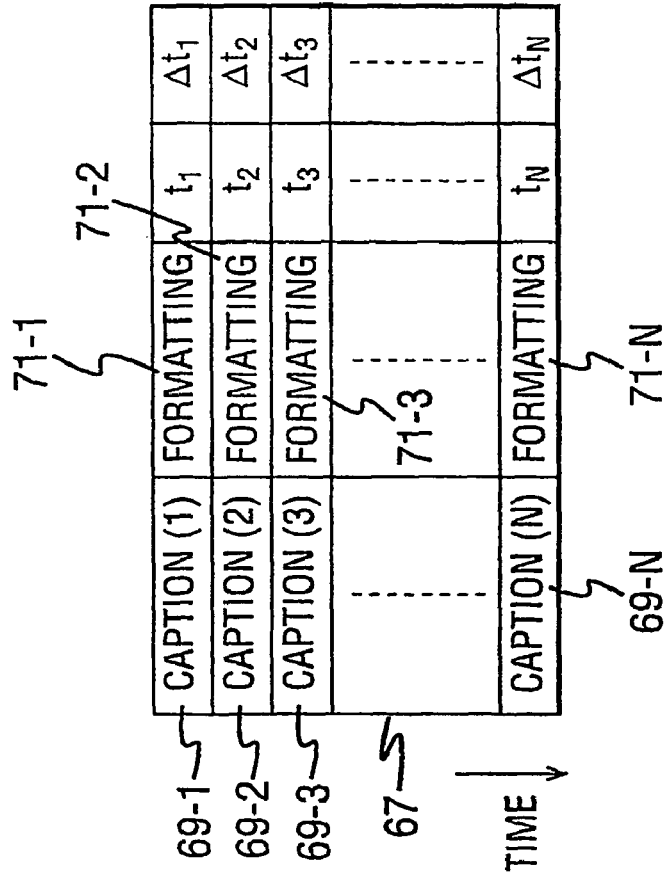
FIG. 2b is a table representing the captions in a caption file downloaded to the telephone shown in FIG. 2a from the remote web server shown in FIG. 1.
Figure 2D:
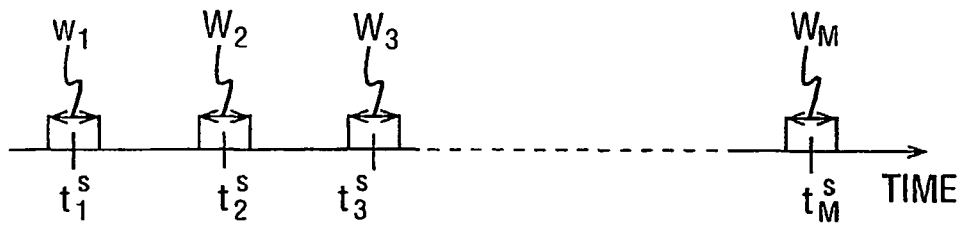
FIG. 2d is a timing diagram illustrating the timing of synchronisation signals and illustrating timing windows during which the mobile telephone processes an audio signal from a microphone thereof.
Figure 2E:
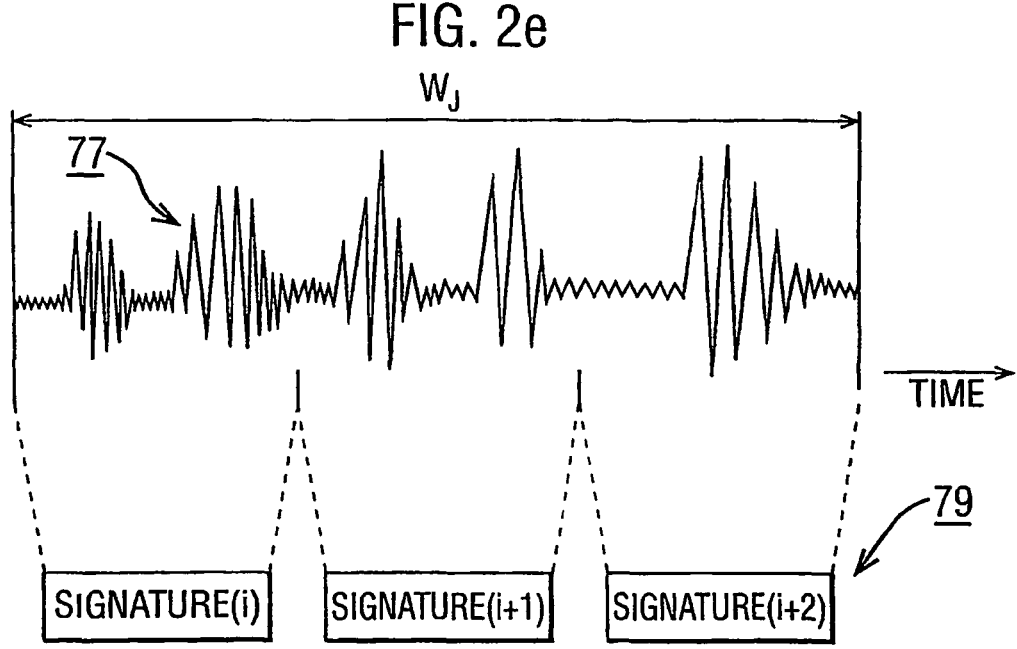
FIG. 2e is a signal diagram illustrating an exemplary audio signal received by a microphone of the telephone shown in FIG. 2a and the signature stream generated by a signature extractor forming part of the mobile telephone.
Figure 2F:
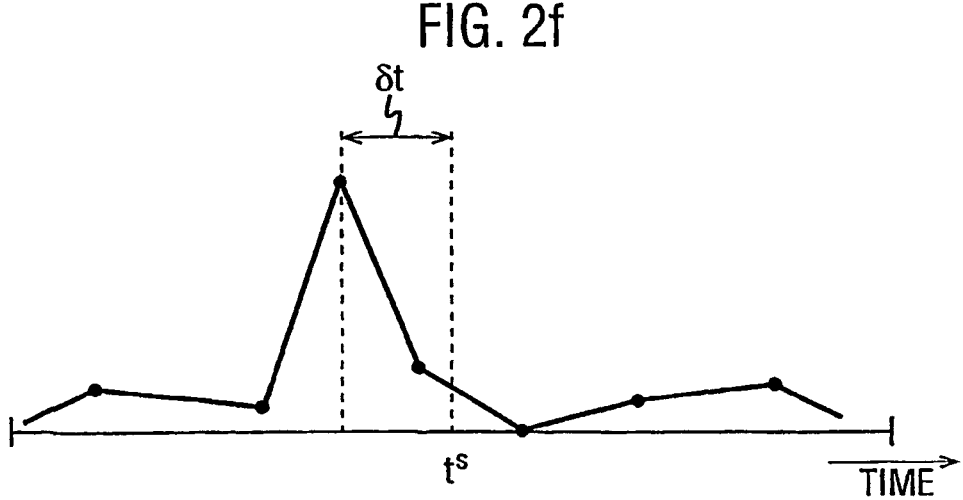
FIG. 2f illustrates an output from a correlator forming part of the mobile telephone shown in FIG. 2a, which is used to synchronise the display of captions to the user with the film being watched.
Figure 2G:
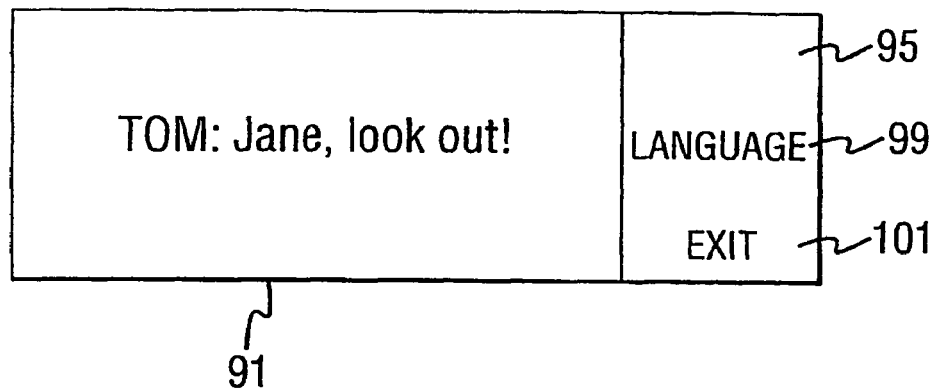
FIG. 2a is a schematic block diagram illustrating the main components of a user telephone that is used in the captioning system shown in FIG. 1.
Figure 3:
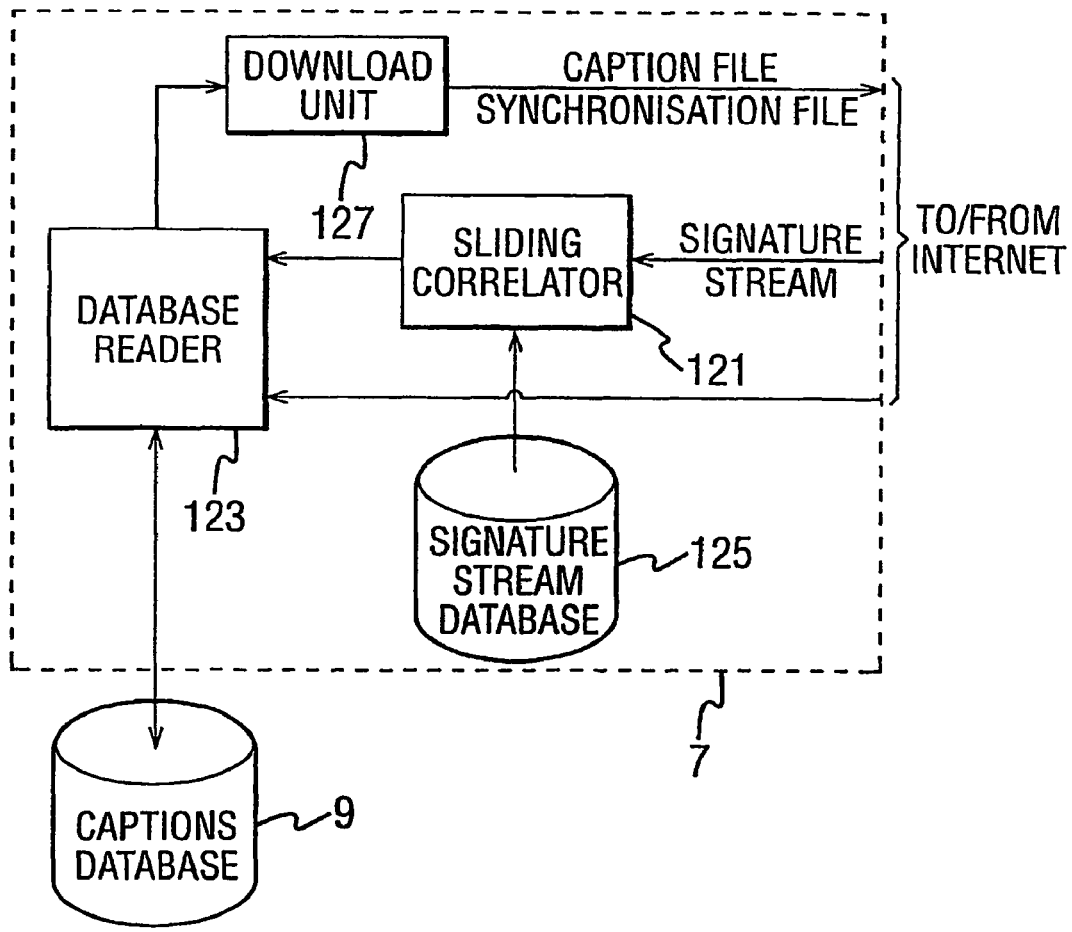
Figure 4:
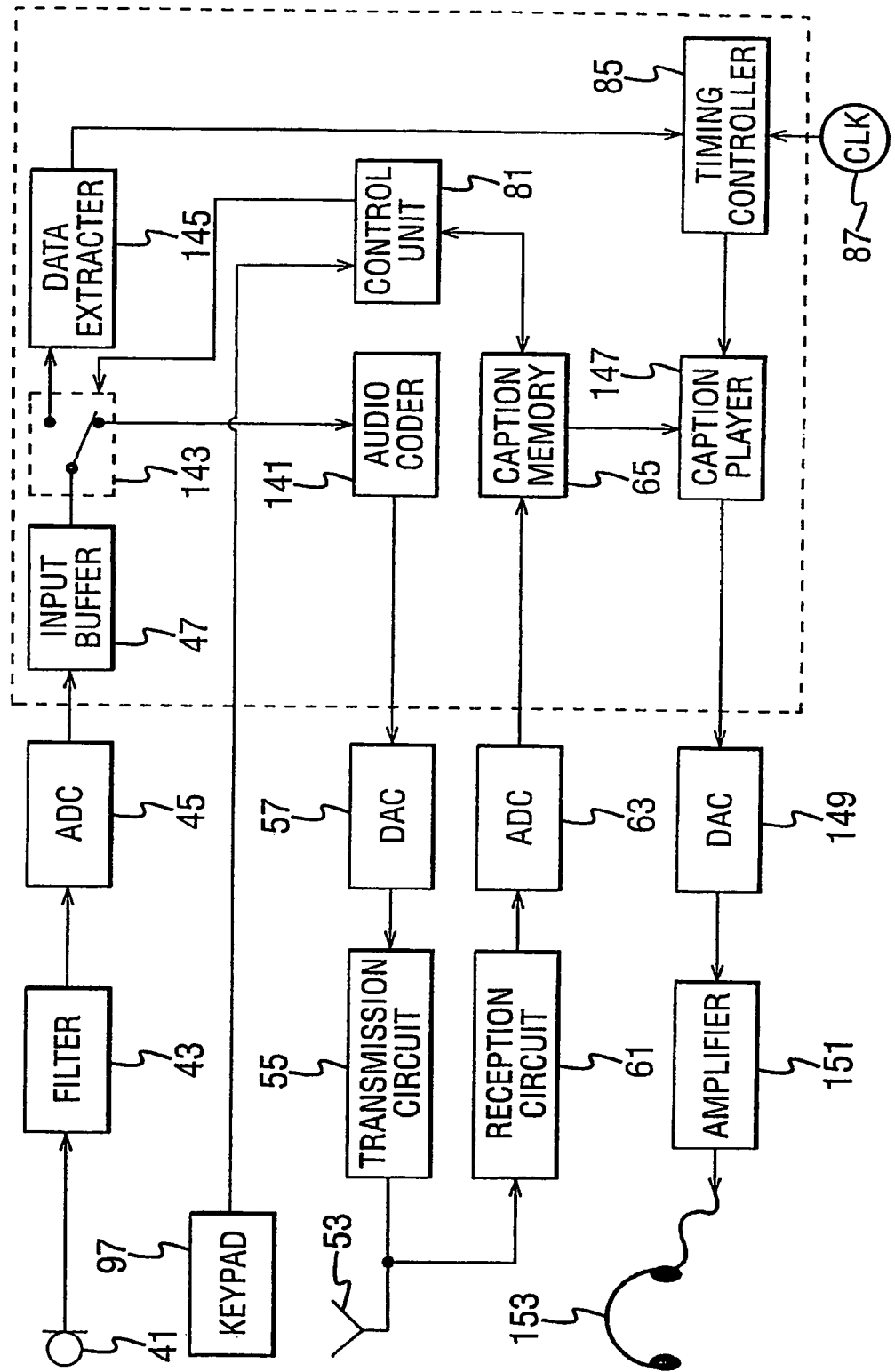
Figure 5:
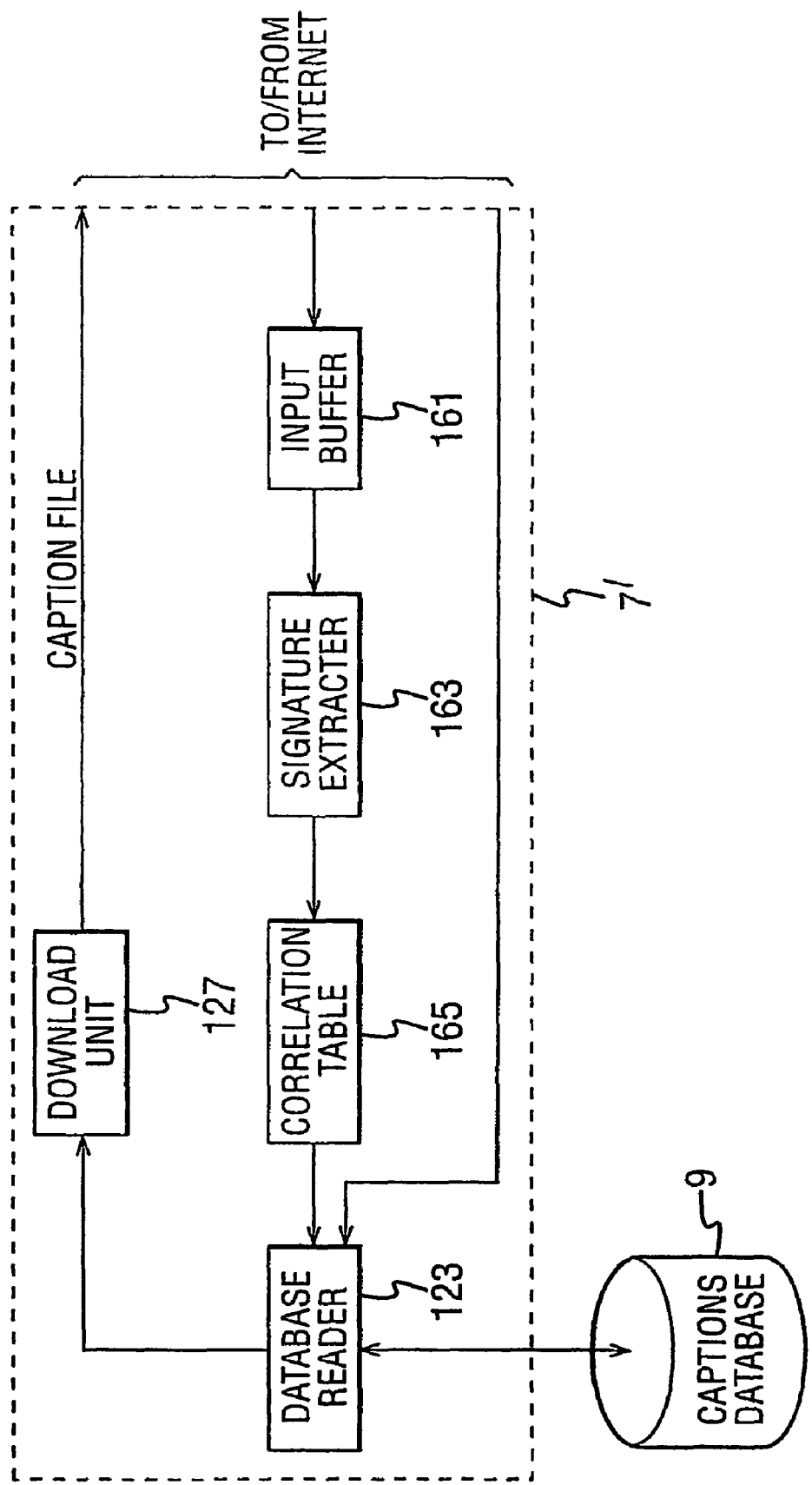

FIG. 2g schematically illustrates a screen shot from the telephone illustrated in FIG. 2a showing an example caption that is displayed to the user;

FIG. 3 is a schematic block diagram illustrating the main components of the remote web server forming part of the captioning system shown in FIG. 1;

FIG. 4 is a schematic block diagram illustrating the main components of a portable user device of an alternative embodiment; and FIG. 5 is a schematic block diagram illustrating the main components of the remote server used with the portable user device shown in FIG. 5.

OVERVIEW

FIG. 1 schematically illustrates a captioning system for use in providing text captions on a number of user devices (two of which are shown and labelled 1-1 and 1-2) for a film being shown on a screen 3 within a cinema 5. The captioning system also includes a remote web server 7 which controls access by the user devices 1 to captions stored in a captions database 9. In particular, in this embodiment, the user device 1-1 is a mobile telephone which can connect to the remote web server 7 via a cellular communications base station 11, a switching centre 13 and the Internet 15 to download captions from the captions database 9. In this embodiment, the second user device 1-2 is a personal digital assistant (PDA) that does not have cellular telephone transceiver circuitry. This PDA 1-2 can, however, connect to the remote web server 7 via a computer 17 which can connect to the Internet 15. The computer 17 may be a home computer located in the user's home 19 and may typically include a docking station 21 for connecting the PDA 1-2 with the computer 17.

In this embodiment, the operation of the captioning system using the mobile telephone 1-1 is slightly different to the operation of the captioning system using the PDA 1-2. A brief description of the operation of the captioning system using these devices will now be given.

In this embodiment, the mobile telephone 1-1 operates to download the caption for the film to be viewed at the start of the film. It does this by capturing a portion of soundtrack from the beginning of the film, generated by speakers 23-1 and 23-2, which it processes to generate a signature that is characteristic of the audio segment. The mobile telephone 1-1 then transmits this signature to the remote web server 7 via the base station 11, switching station 13 and the Internet 15. The web server 7 then identifies the film that is about to begin from the signature and retrieves the appropriate caption file together with an associated synchronisation file which it transmits back to the mobile telephone 1-1 via the Internet 15, switching centre 13 and base station 11. After the caption file and the synchronisation file have been received by the mobile telephone 1-1, the connection with the base station 11 is terminated and the mobile telephone 1-1 generates and displays the appropriate captions to the user in synchronism with the film that is shown on the screen 3. In this embodiment, the synchronisation data in the synchronisation file downloaded from the remote web server 7 defines the estimated timing of subsequent audio segments within the film and the mobile telephone 1-1 synchronises the playout of the captions by processing the audio signal of the film and identifying the actual timing of those subsequent audio segments in the film.

In this embodiment, the user of the PDA 1-2 downloads the caption for the film while they are at home 19 using their personal computer 17 in advance of the film being shown. In particular, in this embodiment, the user types in the name of the film that they are going to see into the personal computer 17 and then sends this information to the remote web 7 server via the Internet 15. In response, the web server 7 retrieves the appropriate caption file and synchronisation file for the film which it downloads to the user's personal computer 17. The personal computer 17 then stores the caption file and the synchronisation file in the PDA 1-2 via the docking station 21. In this embodiment, the subsequent operation of the PDA 1-2 to synchronise the display of the captions to the user during the film is the same as the operation of the mobile telephone 1-1 and will not, therefore, be described again.

Mobile Telephone

A brief description has been given above of the way in which the mobile telephone 1-1 retrieves and subsequently plays out the captions for a film to a user. A more detailed description will now be given of the main components of the mobile telephone 1-1 which are shown in block form in FIG. 2a. As shown, the mobile telephone 1-1 includes a microphone 41 for detecting the acoustic sound signal generated by the speakers 23 in the cinema 5 and for generating a corresponding electrical audio signal. The audio signal from the microphone 41 is then filtered by a filter 43 to remove frequency components that are not of interest. The filtered audio signal is then converted into a digital signal by the analogue to digital converter (ADC) 45 and then stored in an input buffer 47. The audio signal written into the input buffer 47 is then processed by a signature extractor 49 which processes the audio to extract a signature that is characteristic of the buffered audio. Various processing techniques can be used by the signature extractor 49 to extract this signature. For example, the signature extractor may carry out the processing described in WO 02/11123 in the name of Shazam Entertainment Limited. In this system, a window of about 15 seconds of audio is processed to identify a number of "fingerprints" along the audio string that are representative of the audio. These fingerprints together with timing information of when they occur within the audio string forms the above described signature.

As shown in FIG. 2a, the signature generated by the signature extractor is then output to an output buffer 51 and then transmitted to the remote web server 7 via the antenna 53, a transmission circuit 55, a digital to analogue converter (DAC) 57 and a switch 59.

As will be described in more detail below, the remote server 7 then processes the received signature to identify the film that is playing and to retrieve the appropriate caption file and synchronisation file for the film. These are then downloaded back to the mobile telephone 1-1 and passed, via the aerial 53, reception circuit 61 and analogue to digital converter 63 to a caption memory 65. FIG. 2b schematically illustrates the form of the caption file 67 downloaded from the remote web server 7. As shown, in this embodiment, the caption file 67 includes an ordered sequence of captions (caption(1) to caption(N)) 69-1 to 69-N. The caption file 67 also includes, for each caption, formatting information 71-1 to 71-N that defines the font, colour, etc. of the text to be displayed. The caption file 67 also includes, for each caption, a time value $t_1$ to $t_N$ which defines the time at which the caption should be output to the user relative to the start of the film. Finally, in this embodiment, the caption file 67 includes, for each caption 69, a duration $\Delta t_1$ to $\Delta t_N$ which defines the duration that the caption should be displayed to the user.

FIG. 2c schematically represents the data within the synchronisation file 73 which is used in this embodiment by the mobile telephone 1-1 to synchronise the display of the captions with the film. As shown, the synchronisation file 73 includes a number of signatures 75-1 to 75-M each having an associated time value $t_1^s$ to $t_M^s$ identifying the time at which the signature should occur within the audio of the film (again calculated from the beginning of the film).

In this embodiment, the synchronisation file 73 is passed to a control unit 81 which controls the operation of the signature extracting unit 49 and a sliding correlator 83. The control unit 81 also controls the position of the switch 59 so that after the caption and synchronisation files have been downloaded into the mobile telephone 1-1, and the mobile telephone 1-1 is trying to synchronise the output of the captions with the film, the signature stream generated by the signature extractor 49 is passed to the sliding correlator 83 via the output buffer 51 and the switch 59.

Initially, before the captions are output to the user, the mobile telephone 1-1 must synchronise with the film that is playing. This is achieved by operating the signature extractor 49 and the sliding correlator 83 in an acquisition mode, during which the signature extractor extracts signatures from the audio received at the microphone 41 which are then compared with the signatures 75 in the synchronisation file 73, until it identifies a match between the received audio from the film and the signatures 75 in the synchronisation file 73. This match identifies the current position within the film, which is used to identify the initial caption to be displayed to the user. At this point, the mobile telephone 1-1 enters a tracking mode during which the signature extractor 49 only extracts signatures for the audio during predetermined time slots (or windows) within the film corresponding to when the mobile telephone 1-1 expects to detect the next signature in the audio track of the film. This is illustrated in FIG. 2d which shows a time line (representing the time line for the film) together with the timings $t_1^s$ to $t_M^s$ corresponding to when the mobile telephone 1-1 expects the signatures to occur within the audio track of the film. FIG. 2d also shows a small time slot or window $w_1$ to $w_M$ around each of these time points, during which the signature extractor 49 processes the audio signal to generate a signature stream which it outputs to the output buffer 51.

The generation of the signature stream is illustrated in FIG. 2e which shows a portion 77 of the audio track corresponding to one of the time windows $w_j$ and the stream 79 of signatures generated by the signature extractor 49. In this embodiment, three signatures (signature (i), signature (i+1) and signature (i+2)) are generated for each processing window w. This is for illustration purposes only. In practice, many more or less signatures may be generated for each processing window w. Further, whilst in this embodiment the signatures are generated from non-overlapping subwindows of the processing window w, the signatures may also be generated from overlapping subwindows. The way in which this would be achieved will be well known to those skilled in the art and will not be described in any further detail.

In this embodiment, between adjacent processing windows w, the control unit 51 controls the signature extractor 49 so that it does not process the received audio. In this way, the processing performed by the signature extractor 49 can be kept to a minimum.

During this tracking mode of operation, the sliding correlator 83 is operable to correlate the generated signature stream in output buffer 51 with the next signature 75 in the synchronisation file 73. This correlation generates a correlation plot such as that shown in FIG. 2f for the window of audio being processed. As shown in FIG. 2d, in this embodiment, the windows $w_j$ are defined so that the expected timing of the signature is in the middle of the window. This means that the mobile telephone 1-1 expects the peak output from the sliding correlator 83 to correspond to the middle of the processing window w. If the peak occurs earlier or later in the window then the caption output timing of the mobile telephone 1-1 must be adjusted to keep it in synchronism with the film. This is illustrated in FIG. 2f which shows the expected time of the signature $t_s$ appearing in the middle of the window and the correlation peak occurring δt seconds before the expected time. This means that the mobile telephone 1-1 is slightly behind the film and the output timing of the subsequent captions must be brought forward to catch up with the film. This is achieved by passing the δt value from the correlator 83 into a timing controller 85 which generates the timing signal for controlling the time at which the captions are played out to the user. As shown, the timing controller receives its timing reference from the mobile telephone clock 87. The generated timing signal is then passed to a caption display engine 89 which uses the timing signal to index the caption file 67 in order to retrieve the next caption 69 for display together with the associated duration information Δt and formatting information 71 which it then processes and outputs for display on the mobile telephone display 91 via a frame buffer 93. The details of how the caption 69 is generated and formatted are well known to those skilled in the art and will not be described in any further detail.

FIG. 2g illustrates the form of an example caption which is output on the display 91. FIG. 2g also shows in the right hand side 95 of the display 91 a number of user options that the user can activate by pressing appropriate function keys on the keypad 97 of the mobile telephone 1-1. These include a language option 99 which allows the user to change the language of the caption 69 that is displayed. This is possible, provided the caption file 67 includes captions 69 in different languages. As the skilled man will appreciate, this does not involve any significant processing on the part of the mobile telephone 1-1, since all that is being changed is the text of the caption 69 that is to be displayed at the relevant timings. It is therefore possible to personalise the captions for different users watching the same film. The options also include an exit option 101 for allowing the user to exit the captioning application being run on the mobile telephone 1-1.

Personal Digital Assistant

As mentioned above, the PDA 1-2 operates in a similar way to the mobile telephone 1-1 except it does not include the mobile telephone transceiver circuitry for connecting directly to the web server 7. The main components of the PDA 1-2 are similar to those of the mobile telephone 1-1 described above and will not, therefore, be described again.

Remote Web Server

FIG. 3 is a schematic block diagram illustrating the main components of the web server 7 used in this embodiment and showing the captions database 9. As shown, the web server 7 receives input from the Internet 15 which is either passed to a sliding correlator 121 or to a database reader 123, depending on whether or not the input is from the mobile telephone 1-1 or from the PDA 1-2. In particular, the signature from the mobile telephone 1-1 is input to the sliding correlator 121 where it is compared with signature streams of all films known to the system, which are stored in the signature stream database 125. The results of these correlations are then compared to identify the film that the user is about to watch. This film ID is then passed to the database reader 123. In response to receiving a film ID either from the sliding correlator 121 or directly from a user device (such as the PC 17 or PDA 1-2), the database reader 123 reads the appropriate caption file 67 and synchronisation file 73 from the captions database 9 and outputs them to a download unit 127. The download unit 127 then downloads the retrieved caption file 67 and synchronisation file 73 to the requesting user device 1 via the Internet 15.

As those skilled in the art will appreciate, a captioning system has been described above for providing text captions for a film for display to a user. The system does not require any modifications to the cinema or playout system, but only the provision of a suitably adapted mobile telephone 1-1 or PDA device 1-2 or the like. In this regard, it is not essential to add any additional hardware to the mobile telephone or the PDA, since all of the functionality enclosed in the dashed box 94 can be performed by an appropriate software application run within the mobile telephone 1-1 or PDA 1-2. In this case, the appropriate software application may be loaded at the appropriate time, e.g. when the user enters the cinema and in the case of the mobile telephone 1-1, is arranged to cancel the ringer on the telephone so that incoming calls do not disturb others in the audience. The above captioning system can therefore be used for any film at any time. Further, since different captions can be downloaded for a film, the system allows for content variation within a single screening. This facilitates, for example, the provision of captions in multiple languages.

Modifications and Alternative Embodiments

In the above embodiment, a captioning system was described for providing text captions on a display of a portable user device for allowing users with hearing disabilities to understand a film being watched. As discussed in the introduction of this application, the above captioning system can be modified to operate with audio captions (e.g. audio descriptions of the film being displayed for people with impaired eyesight). This may be done simply by replacing the text captions 69 in the caption file 67 that is downloaded from the remote server 7 with appropriate audio files (such as the standard .WAV or MP3 audio files) which can then be played out to the user via an appropriate headphone or earpiece. The synchronisation of the playout of the audio files could be the same as for the synchronisation of the playout of the text captions. Alternatively synchronisation can be achieved in other ways. FIG. 4 is a block diagram illustrating the main components of a mobile telephone that can be used in such an audio captioning system. In FIG. 4, the same reference numerals have been used for the same components shown in FIG. 2*a* and these components will not be described again.

In this embodiment, the mobile telephone 1-1' does not include the signature extractor 49. Instead, as illustrated in FIG. 5, the signature extractor 163 is provided in the remote web server 7'. In operation, the mobile telephone 1-1' captures part of the audio played out at the beginning of the film and transmits this audio through to the remote web server 7'. This audio is then buffered in the input buffer 161 and then processed by the signature extractor 163 to extract a signature representative of the audio. This signature is then passed to a correlation table 165 which performs a similar function to the sliding correlator 121 and signature stream database 125 described in the first embodiment, to identify the ID for the film currently being played. In particular, in this embodiment, all of the possible correlations that may have been performed by the sliding correlator 121 and the signature stream database 125 are carried out in advance and the results are stored in the correlation table 165. In this way, the signature output by the signature extractor 163 is used to index this correlation table to generate correlation results for the different films known to the captioning system. These correlation results are then processed to identify the most likely film corresponding to the received audio stream. In this embodiment, the captions database 9 only includes the caption files 67 for the different films, without any synchronisation 73 files. In response to receiving the film ID either from the correlation table 165 or from a user direct from a user device (not shown), the database reader 123 retrieves the appropriate caption file 67 which it downloads to the user device 1 via the download unit 127.

Returning to FIG. 4, in this embodiment, since the mobile telephone 1-1' does not include the signature extractor 49, synchronisation is achieved in an alternative manner. In particular, in this embodiment, synchronisation codes are embedded within the audio track of the film. Therefore, after the caption file 67 has been stored in the caption memory 65, the control circuit 81 controls the position of the switch 143 so that the audio signal input into the input buffer 47 is passed to a data extractor 145 which is arranged to extract the synchronisation data that is embedded in the audio track. The extracted synchronisation data is then passed to the timing controller 85 which controls the timing at which the individual audio captions are played out by the caption player 147 via the digital-to-analogue converter 149, amplifier 151 and the headset 153.

As those skilled in the art will appreciate, various techniques can be used to embed the synchronisation data within the audio track. The applicant's earlier International applications WO 98/32248, WO 01/10065, PCT/GB01/05300 and PCT/GB01/05306 describe techniques for embedding data within acoustic signals and appropriate data extractors for subsequently extracting the embedded data. The contents of these earlier International applications are incorporated herein by reference.

In the above audio captioning embodiment, synchronisation was achieved by embedding synchronisation codes within the audio and detecting these in the mobile telephone. As those skilled in the art will appreciate, a similar technique may be used in the first embodiment. However, embedding audio codes within the soundtrack of the film is not preferred, since it involves modifying in some way the audio track of the film. Depending on the data rates involved, this data may be audible to some viewers which may detract from their enjoyment of the film. The first embodiment is therefore preferred since it does not involve any modification to the film or to the cinema infrastructure.

In embodiments where the synchronisation data is embedded within the audio, the synchronisation codes used can either be the same code repeated whenever synchronisation is required or it can be a unique code at each synchronisation point. The advantage of having a unique code at each synchronisation point is that a user who enters the film late or who requires the captions only at certain points (for example a user who only rarely requires the caption) can start captioning at any point during the film.

In the embodiment described above with reference to FIGS. 4 and 5, the signature extraction operation was performed in the remote web server rather than in the mobile telephone. As those skilled in the art will appreciate, this modification can also be made to the first embodiment described above, without the other modifications described with reference to FIGS. 4 and 5.

In the first embodiment described above, during the tracking mode of operation, the signature extractor only processed the audio track during predetermined windows in the film. As those skilled in the art will appreciate, this is not essential. The signature extractor could operate continuously. However, such an embodiment is not preferred since it increases the processing that the mobile telephone has to perform which is likely to increase the power consumption of the mobile telephone.

In the above embodiments, the mobile telephone or PDA monitored the audio track of the film for synchronisation purposes. As those skilled in the art will appreciate, the mobile telephone or PDA device may be configured to monitor the video being displayed on the film screen. However, this is currently not preferred because it would require an image pickup device (such as a camera) to be incorporated into the mobile telephone or PDA and relatively sophisticated image processing hardware and software to be able to detect the synchronisation points or codes in the video. Further, it is not essential to detect synchronisation codes or synchronisation points from the film itself. Another electromagnetic or pressure wave signal may be transmitted in synchronism with the film to provide the synchronisation points or synchronisation codes. In this case, the user device would have to include an appropriate electromagnetic or pressure wave receiver. However, this embodiment is not preferred since it requires modification to the existing cinema infrastructure and it requires the generation of the separate synchronisation signal which is itself synchronised to the film.

In the above embodiments, the captions and where appropriate the synchronisation data, were downloaded to a user device from a remote server. As those skilled in the art will appreciate, the use of such a remote server is not essential. The caption data and the synchronisation data may be pre-stored in memory cards or smart cards and distributed or sold at the cinema. In this case, the user device would preferably have an appropriate slot for receiving the memory card or smart-card and an appropriate reader for accessing the caption data and, if provided, the synchronisation data. The manufacture of the cards would include the steps of providing the memory card or smart-card and using an appropriate card writer to write the captions and synchronisation data into the memory card or into a memory on the smart-card. Alternatively still, the user may already have a smart-card or memory card associated with their user device which they simply insert into a kiosk at the cinema where the captions and, if applicable, the synchronisation data are written into a memory on the card.

As a further alternative, the captions and synchronisation data may be transmitted to the user device from a transmitter within the cinema. This transmission may be over an electromagnetic or a pressure wave link.

In the first embodiment described above, the mobile telephone had an acquisition mode and a subsequent tracking mode for controlling the playout of the captions. In an alternative embodiment, the acquisition mode may be dispensed with, provided that the remote server can identify the current timing from the signature received from the mobile telephone. This may be possible in some instances. However, if the introduction of the film is repetitive then it may not be possible for the web server to be able to provide an initial synchronisation.

In the first embodiment described above, the user devices downloaded the captions and synchronisation data from a remote web server via the internet. As those skilled in the art will appreciate, it is not essential to download the files over the internet. The files may be downloaded over any wide area or local area network. The ability to download the caption files from a wide area network is preferred since centralised databases of captions may be provided for distribution over a wider geographic area.

In the first embodiment described above, the user downloaded captions and synchronisation data from a remote web server. Although not described, for security purposes, the caption file and the synchronisation file are preferably encoded or encrypted in some way to guard against fraudulent use of the captions. Additionally, the caption system may be arranged so that it can only operate in cinemas or at venues that are licensed under the captioning system. In this case, an appropriate activation code may be provided at the venue in order to "unlock" the captioning system on the user device. This activation may be provided in human readable form so that the user has to key in the code into the user device. Alternatively, the venue may be arranged to transmit the code (possibly embedded in the film) to an appropriate receiver in the user device. In either case, the captioning system software in the user device would have an inhibitor that would inhibit the outputting of the captions until it received the activation code. Further, where encryption is used, the activation code may be used as part of the key for decrypting the captions.

The above embodiments have described text captioning systems and audio captioning systems for use in a cinema. As those skilled in the art will appreciate, these captioning systems may be used for providing captions for any radio, video or multi-media presentation. They can also be used in the theatre or opera or within the user's home.

Various captioning systems have been described above which provide text or audio captions for an audio or a video presentation. The captions may include extra commentary about the audio or video presentation, such as director's comments, explanation of complex plots, the names of actors in the film or third party comments. The captions may also include adverts for other products or presentations. In addition, the audio captioning system may be used not only to provide audio descriptions of what is happening in the film, but also to provide a translation of the audio track for the film. In this way, each listener in the film can listen to the film in their preferred language. The caption system can also be used to provide karaoke captions for use with standard audio tracks. In this case, the user would download the lyrics and the synchronisation information which define the timing at which the lyrics should be displayed and highlighted to the user.

In addition to the above, the captioning system described above may be provided to control the display of video captions. For example, such video captions can be used to provide sign language (either real images or computer generated images) for the audio in the presentation being given.

In the above embodiments, the captions for the presentation to be made were downloaded in advance for playout. In an alternative embodiment, the captions may be downloaded from the remote server by the user device when they are needed. For example, the user device may download the next caption when it receives the next synchronisation code for the next caption.

In the caption system described above, a user downloads or receives the captions and the synchronisation information either from a web server or locally at the venue at which the audio or visual presentation is to be made. As those skilled in the art will appreciate, for applications where the user has to pay to download or playout the captions, a transaction system is preferably provided to facilitate the collection of the monies due. In embodiments where the captions are downloaded from a web server, this transaction system preferably forms part of or is associated with the web server providing the captions. In this case, the user can provide electronic payment or payment through credit card or the like at the time that they download the captions. This is preferred, since it is easier to link the payment being made with the captions and synchronisation information downloaded.

In the first embodiment described above, the ID for the film was automatically determined from an audio signature transmitted from the user's mobile telephone. Alternatively, instead of transmitting the audio signature, the user can input the film ID directly into the telephone for transmission to the remote server. In this case, the correlation search of the signature database is not essential.

In the first embodiment described above, the user device processed the received audio to extract a signature characteristic of the film that they are about to watch. The processing that is preferred is the processing described in the Shazam Entertainment Ltd patent mentioned above. However, as those skilled in the art will appreciate, other types of encoding may be performed. The main purpose of the signature extractor unit in the mobile telephone is to compress the audio to generate data that is still representative of the audio from which the remote server can identify the film about to be watched. Various other compression schemes may be used. For example, a GSM codec together with other audio compression algorithms may be used.

In the above embodiments in which text captions are provided, they were displayed to the user on a display of a portable user device. Whilst this offers the simplest deployment of the captioning system, other options are available. For example, the user may be provided with an active or passive type head-up-display through which the user can watch the film and on which the captions are displayed (active) or are projected (passive) to overlay onto the film being watched. This has the advantage that the user does not have to watch two separate displays. A passive type of head-up-display can be provided, for example, by providing the user with a pair of glasses having a beam splitter (e.g. a 45° prism) on which the user can see the cinema screen and the screen of their user device (e.g. phone or PDA) sitting on their lap. Alternatively, instead of using a head-up-display, a separate transparent screen may be erected in front of the user's seat and onto which the captions are projected by the user device or a seat-mounted projector.

In the first embodiment described above, the caption file included a time ordered sequence of captions together with associated formatting information and timing information. As those skilled in the art will appreciate, it is not essential to arrange the captions in such of time sequential order. However, arranging them in this way reduces the processing involved in identifying the next caption to display. Further, it is not essential to have formatting information in addition to the caption. The minimum information required is the caption information. Further, it is not essential that this be provided in a file as each of the individual captions for the presentation may be downloaded separately. However, the above described format for the caption file is preferred since it is simple and can easily be created using, for example, a spreadsheet. This simplicity also provides the potential to create a variety of different caption content.

In embodiments where the user's mobile telephone is used to provide the captioning, the captioning system can be made interactive whereby the user can interact with the remote server, for example interacting with adverts or questionaries before the film starts. This interaction can be implemented using, for example, a web browser on the user device that receives URLs and links to other information on websites.

In the first embodiment described above, text captions were provided for the audio in the film to be watched. These captions may include full captions, subtitles for the dialogue only or subtitles at key parts of the plot. Similar variation may be applied for audio captions.

The invention claimed is:

1. A captioning system for providing captions for a presentation to a user, the presentation including a wireless acoustic signal, the captioning system comprising:
   a caption store operable to store one or more sets of captions each set being associated with one or more presentations and each set comprising a plurality of captions for playout at different timings during the associated presentation; and
   a cellular telephone having:
   i) a first receiver configured to receive, from said caption store, at least one set of captions for storage in the cellular telephone or to receive a sequence of captions for a presentation to be made to a user associated with the cellular telephone;
   ii) a microphone configured to receive the wireless acoustic signal of the presentation and to generate a corresponding electrical signal;
   iii) a synchronizer configured to process the electrical signal obtained from the microphone corresponding to said acoustic signal of said presentation, to determine synchronization information for use in defining the timing during the presentation at which each caption is to be output to the user associated with the cellular telephone;
   iv) a caption output operable to output each received caption to the user associated with the cellular telephone; and
   v) a timing controller configured to determine the timing during the presentation at which each caption should be output based on the synchronization information determined by said synchronizer and configured to control said caption output so that each caption is output to said user at the determined timing.

2. A system according to claim 1, wherein said captions include text and wherein said caption output is operable to output said captions to a display device associated with the cellular telephone for display to the user.

3. A system according to claim 2, wherein said captions include formatting information for controlling the format of the text displayed on said display.

4. A system according to claim 2, wherein each caption includes duration information defining the duration that the caption should be displayed to the user.

5. A system according to claim 2, wherein said caption includes timing information defining the time at which the caption should be displayed to the user during the presentation.

6. A system according to claim 1, wherein said presentation includes video.

7. A system according to claim 1, wherein said caption store is formed in a memory card which is insertable into said cellular telephone and wherein said cellular telephone includes a reader for reading captions from said memory card when inserted therein.

8. A system according to claim 1, wherein said caption store is provided in a computer system and wherein said cellular telephone includes a communication module for communicating with said computer system.

9. A system according to claim 8, wherein said computer system is remote from said cellular telephone.

10. A system according to claim 8, wherein said cellular telephone includes a housing and wherein said communication module is provided within said housing.

11. A system according to claim 8, wherein said communication module is operable to communicate with said remote computer system using a wireless communication link.

12. A system according to claim 1, wherein said synchronization information defines time points for one or more predetermined acoustic portions of the presentation.

13. A system according to claim 1, wherein said receiver is configured to receive synchronization data associated with the set of captions, the synchronization data identifying expected time points of one or more predetermined acoustic portions of the presentation and wherein said synchronizer comprises a monitoring circuit operable to monitor said electrical signal obtained from the microphone to identify actual time points of said one or more predetermined acoustic portions of the presentation and wherein said synchronization information generated by said synchronizer comprises a difference between the actual time points identified by the monitoring circuit and the expected time points identified by said synchronization data.

14. A system according to claim 13, wherein said synchronization data associated with the set of captions includes a signature for each of said one or more predetermined acoustic portions of the presentation, wherein said monitoring circuit is configured to process said electrical signal from the microphone and to generate a signature for a current portion of the presentation, wherein the synchronizer further comprises a comparator that is configured to compare the signature generated by the monitoring circuit with a signature of said synchronization data and wherein the cellular telephone has: a) an acquisition mode of operation in which the signature generated by the monitoring circuit is compared with each of said signatures of said synchronization data to identify a current position within said presentation; and b) a tracking mode of operation in which the signature generated by said monitoring circuit is compared with an expected one of the signatures of said synchronization data.

15. A system according to claim 14, wherein during said tracking mode of operation, said monitoring circuit is operable to monitor said presentation during a predetermined time window around an expected time point defined by said synchronization data.

16. A system according to claim 13, wherein said cellular telephone is configured to receive said synchronization data from said caption store.

17. A system according to claim 1, wherein said synchronization information is embedded within said acoustic part of the presentation.

18. The system according to claim 17, wherein said synchronization information comprises synchronization codes that have been added to an audio signal of the presentation so that they occur at different timings during the presentation.

19. A system according to claim 18, wherein each synchronization code is unique to uniquely define the position in the presentation.

20. A system according to claim 1, wherein said caption store includes a plurality of sets of captions for a plurality of different presentations.

21. A system according to claim 20, wherein said cellular telephone is configured to process the electrical signal from the microphone corresponding to the acoustic part of the presentation to determine data for use in identifying the presentation therefrom and is configured to transmit the determined data to said caption store and wherein said caption store is configured to use said determined data to identify the presentation being made and to transmit the associated set of captions for the identified presentation to said first receiver.

22. A system according to claim 21, wherein said determined data comprises data characteristic of a captured portion of the acoustic part of the presentation and is configured to transmit said characteristic data to said caption store, and wherein said caption store is operable to use said characteristic data to identify the presentation being made and to transmit the associated set of captions for the identified presentation to the cellular telephone.

23. A system according to claim 1, wherein said presentation is given at a venue, wherein said venue is operable to provide an activation code, wherein said cellular telephone is configured to receive said activation code and further comprises an inhibitor for inhibiting the operation of said caption output unless said cellular telephone has received said activation code.

24. A portable cellular telephone for use in a captioning system, the portable cellular telephone comprising:
   i) a first receiver configured to receive, from a caption store, at least one set of captions for storage in the cellular telephone or to receive a sequence of captions for a presentation to be made to a user associated with the cellular telephone;
   ii) a microphone configured to receive a wireless acoustic signal that forms part of the presentation and to generate a corresponding electrical signal;
   iii) a synchronizer configured to process the electrical signal obtained from the microphone corresponding to said acoustic signal of said presentation, to determine synchronization information for use in defining the timing during the presentation at which each caption is to be output to the user associated with the cellular telephone;
   iv) a caption output operable to output each received caption to the user associated with the cellular telephone; and
   v) a timing controller configured to determine the timing during the presentation at which each caption should be output based on the synchronization information determined by said synchronizer and configured to control said caption output so that each caption is output to said user at the determined timing.

25. A non-transitory computer readable medium storing computer executable instructions for causing a general purpose computing device to operate as the portable cellular telephone of claim 24.

26. A captioning system for providing captions for a presentation to a user, the presentation including a wireless acoustic signal, the captioning system comprising:
   means for storing one or more sets of captions each set being associated with one or more presentations and each set comprising a plurality of captions for play out at different timings during the associated presentation; and
   a portable cellular telephone having:
   i) means for receiving at least one set of captions for storage in the cellular telephone or for receiving a sequence of captions for a presentation to be made to a user associated with the cellular telephone;
   ii) means for receiving the wireless acoustic signal of the presentation and to generate a corresponding electrical signal;
   iii) a synchronizer configured to process the electrical signal obtained from the microphone corresponding to said acoustic signal of said presentation, to determine synchronization information for use in defining the timing during the presentation at which each caption is to be output to the user associated with the cellular telephone;
   iv) means for outputting each received caption to the user associated with the cellular telephone; and
   v) means for determining the timing during the presentation at which each caption should be output based on the synchronization information determined by said synchronizer and for controlling said output means so that each caption is output to said user at the determined timing.

27. A system according to claim 1, wherein said first receiver is configured to receive said set of captions or said sequence of captions via a telephone network.

28. A system according to claim 1, wherein said first receiver is configured to receive said set of captions or said sequence of captions over a wired communications link in advance of the presentation.

29. A system according to claim 1, wherein said cellular telephone is configured to use said first receiver to download a next caption from said caption store when it detects a synchronization code in the electrical signal received from said microphone that corresponds to the acoustic part of the presentation.

30. A system according to claim 1, wherein said caption store is provided by a remote server.

31. A cellular telephone according to claim 24, wherein said captions include text for display and wherein said captions include formatting information for controlling the format of the displayed text.

32. A cellular telephone according to claim 31, wherein each caption includes duration information defining a duration that the caption should be displayed on said display.

33. A cellular telephone according to claim 31, wherein said caption includes timing information defining the time at which the caption should be displayed to the user during the presentation.

34. A cellular telephone e according to claim 24, wherein said caption store is provided in a remote computer system, wherein said cellular telephone includes a communication module for communicating with said computer system and wherein said first receiver forms part of said communicating means.

35. A cellular telephone according to claim 34, wherein said communication module is configured to communicate with said remote computer system using a wireless communication link.

36. A cellular telephone according to claim 24, configured to receive synchronization data defining the timing during the presentation at which each caption is to be output to the user associated with the cellular telephone and wherein said synchronizer is configured to determine said synchronization information using the received synchronization data and the electrical signal from the microphone.

37. A cellular telephone according to claim 36, wherein said synchronization data defines expected time points for one or more predetermined portions of the presentation.

38. A cellular telephone according to claim 24, wherein said receiver is configured to receive synchronization data associated with the set of captions, the synchronization data identifying expected time points of one or more predetermined acoustic portions of the presentation and wherein said synchronizer comprises comprising a monitoring circuit operable to monitor said electrical signal obtained from the microphone to identify the actual time points of said one or more predetermined acoustic portions of the presentation and wherein said synchronization information generated by said synchronizer comprises a difference between the actual time points identified by the monitoring circuit and the expected time points identified by said synchronization data.

39. A cellular telephone according to claim 38, wherein said synchronization data associated with the set of captions includes a signature for each of said one or more predetermined acoustic portions of the presentation, wherein said monitoring circuit is configured to process said electrical signal from the microphone and to generate a signature for a current portion of the presentation, wherein the synchronizer further comprises a comparator that is configured to compare the signature generated by the monitoring circuit with a signature of said synchronization data and wherein the cellular telephone has: (a) having an acquisition mode of operation in which the signature generated by said monitoring circuit is compared with each of said signatures of said synchronization data to identify a current position within said presentation; and (b) a tracking mode of operation in which the signature generated by said monitoring circuit is compared with an expected one of the signatures of said synchronization data.

40. A cellular telephone according to claim 39, wherein during said tracking mode of operation, said monitoring circuit is configured to monitor said presentation during a predetermined time window around an expected time point defined by said synchronization data.

41. A cellular telephone according to claim 24, wherein said synchronization information is embedded within said acoustic part of the presentation and wherein said synchronizer comprises a monitoring circuit configured to monitor the electrical signal from the microphone corresponding to the acoustic part of the presentation and to extract said synchronization information therefrom.

42. A cellular telephone according to claim 41, wherein said synchronization information comprises synchronization codes occurring at different timings during the presentation.

43. A device according to claim 42, wherein each synchronization code is unique to uniquely define the position in the presentation.

44. A cellular telephone according to claim 24, wherein said caption store includes a plurality of sets of captions for a plurality of different presentations and wherein the cellular telephone is configured to process the electrical signal from the microphone corresponding to the acoustic part of the presentation to determine data for use in identifying the presentation therefrom and is configured to transmit the determined data to said caption store for use by the caption store to identify the presentation being made.

45. A cellular telephone according to claim 44, wherein the determined data comprises data characteristic of a captured portion of the acoustic part of the presentation and configured to transmit said characteristic data to said caption store for use by the caption store to identify the presentation.

46. A method of providing captions for a presentation to a user, the presentation including a wireless acoustic signal and the method comprising:
storing, at a caption store, one or more sets of captions each being associated with one or more presentations and each comprising a plurality of captions for playout at different timings during the associated presentation; and
at a portable cellular telephone:
using a first receiver to receive, from said caption store, at least one set of captions for storage in the cellular telephone or to receive a sequence of captions for a presentation to be made to an associated user;
using a microphone to receive the wireless acoustic signal of the presentation and to generate a corresponding electrical signal;
processing the electrical signal obtained from the microphone corresponding to said acoustic signal of said presentation, to determine synchronization information for use in defining the timing during the presentation at which each caption is to be output to the user;
outputting the captions to the associated user; and
determining the timing during the presentation at which each caption should be output based on the determined synchronization information and controlling the outputting step so that each caption is output to the user at the determined timing.

\* \* \* \* \*